Oct. 11, 1960 K. L. WOODMAN 2,956,144
ELECTRONIC OVENS
Filed Dec. 22, 1958

INVENTOR
KENNETH L. WOODMAN
BY
ATTORNEY

United States Patent Office 2,956,144
Patented Oct. 11, 1960

2,956,144

ELECTRONIC OVENS

Kenneth L. Woodman, Mansfield, Ohio, assignor to Westinghouse Electric Corporation, East Pittsburgh, Pa., a corporation of Pennsylvania Filed Dec. 22, 1958, Ser. No. 782,101

5 Claims. (Cl. 219—10.55)

This invention relates to electronic ovens wherein cooking is accomplished by microwave energy and has for an object to provide such an oven with a food supporting surface disposed at counter top level.

Another object of the invention is to provide an electronic oven of simple construction and design and of low cost.

The present invention provides a divided cavity arrangement in an electronic oven wherein a radiating chamber is positioned below a supporting surface located at a convenient height, for example, at counter top level, and a heating chamber is disposed in overlying relation to the radiating chamber above the counter top. Preferably, the structure providing the heating chamber is displaceable with respect to the counter top, either by pivotal movement or by vertical movement, to leave substantially the entire counter top area free for normal use when the oven is not in operation. In one form of the invention the heating structure is suspended from an overhead support, such as a ceiling, and is movable from a position adjacent the ceiling to an operative position where it rests upon the counter top to envelope food or other materials to be cooked. The food is positioned upon a supporting plate forming a portion of the counter top and separating the heating chamber from the radiating chamber disposed therebelow and to which microwave energy is transmitted in the usual manner from an electrical source of such energy by a wave guide.

The foregoing and other objects are effected by the invention as will be apparent from the following accompanying drawings, forming a part of this application, in which.

Figure 1:
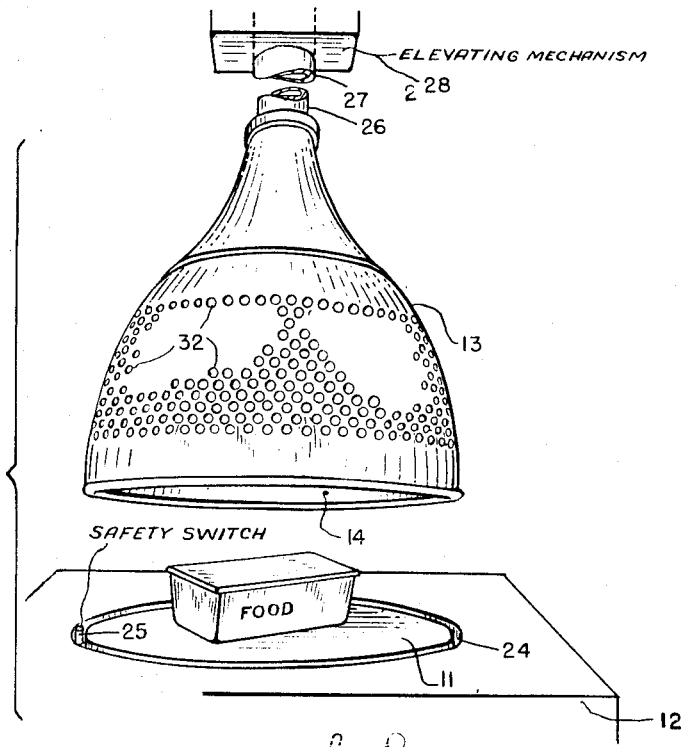
Fig. 1 is a perspective view of an electronic oven constructed in accordance with the present invention, with the heating chamber structure in raised and inoperative position with respect to the remainder of the apparatus.
Figure 2:
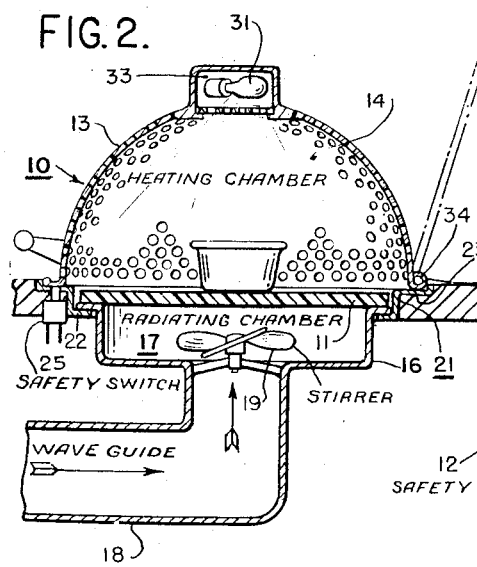
Fig. 2 is a transverse sectional view through a modified oven construction incorporating the invention.

Referring to Figs. 1 and 2 of the drawings, there is shown an electronic oven or heating apparatus in which a supporting plate 11, of a material transparent to microwave energy, is disposed in an opening provided in a counter top 12 or other suitable work surface. A dome-shaped upper enclosure wall 13 is adapted to overlie the plate 11 and to define a heating chamber or oven 14 above the plate. Below the plate 11 is a lower enclosure wall 16 providing a radiating chamber 17 to which microwave energy is directed from any suitable source by a conventional wave guide 18. A suitable stirrer 19 is provided within the radiating chamber 17 to effect adequate distribution of the microwaves within the radiating chamber, it being understood that these waves pass freely through the supporting plate 11 to the heating chamber 14 thereabove containing the food or other materials to be heated.

The opening provided in the counter top 12 may be lined with a metallic stepped member 21 having a lower horizontal flange 22 for supporting the lower enclosure wall and providing therewith a lower enclosure wall structure. The stepped member 21 also has an upper horizontal flange 23 for supporting the dome-shaped upper enclosure wall 13. The upper and lower enclosure walls 13 and 16, respectively, as well as the stepped member 21, are metallic in order to reflect the microwaves within the cavity or chambers provided by these structures. Preferably, the upper horizontal flange is positioned slightly below the upper surface of the counter top 12 to provide a recess 24 (Fig. 1) for reception of the lower edge of the upper enclosure wall 13 to prevent leakage of stray microwaves past the joint between the upper enclosure wall and the upper horizontal flange 23.

A safety switch 25 may be provided in the flange 23 to insure interruption of power to the source of the microwave energy at all times that the domed wall 13 is out of contact with the flange 23.

In the construction shown in Fig. 1, the dome-shaped upper enclosure wall 13 has a tapered neck terminating in a tubular member 26 telescopically received within a similar tubular member 27 depending from elevating mechanism indicated schematically at 28 and positioned directly above the oven, for example, on the ceiling. The details of the elevating mechanism form no part of the present invention and, hence, it is believed sufficient to state that it may comprise any mechanism for vertically adjusting upper enclosure wall 13 from an operative position where the dome rests upon the counter top to an inoperative position where it is disposed well above the counter top to provide ready access to the supporting plate 11 and to permit normal use of the cooking portion of the counter top when the oven is not in use.

A suitable light source (not shown in Fig. 1) may be provided within the top of the dome to light the interior of the heating chamber during cooking operations. The light may be continuously energized during the cooking operation or may be manually energized momentarily by the housewife when she desires to observe the progress of the cooking operation. To this end, the dome-shaped upper enclosure wall 13 may be provided with a pattern of perforations 32 through which the food may be observed without the necessity of lifting the upper enclosure wall 13, which would interrupt the cooking program.

The construction shown in Fig. 2 differs from that described in connection with Fig. 1 in two respects. Firstly, the dome-shaped upper enclosure wall 13 is hinged, as at 34, preferably at the rear thereof, so that it may be pivoted between an operative position as shown in full lines, and an inoperative position shown in dot-dash lines. When in the latter position, the major portion of the counter top is unencumbered for normal use in food preparation or other operations. Secondly, the top of the dome-shaped upper enclosure wall is modified to provide a recess 33 for the reception of the light source 31.

Figure 3:
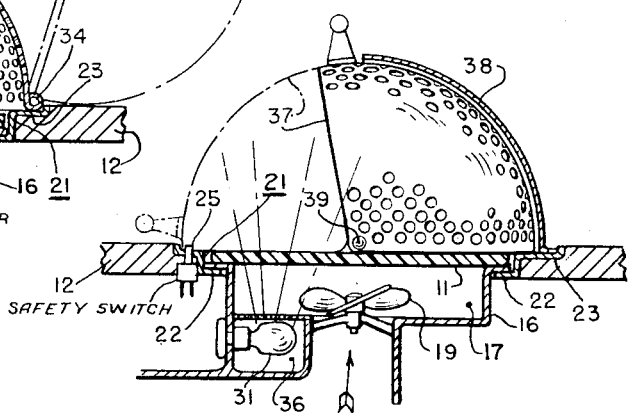
Fig. 3 is a similar view of another form of the invention.

In the arrangement shown in Fig. 3, a recess 36 has been provided below the radiating chamber 17 for reception of the light source 31, and the dome-shaped upper enclosure wall has been divided into two parts 37 and 38, each constituting slightly more than a quarter sphere. The quarter sphere 37 is mounted, as at 39, for pivotal movement between an operative position shown in dot-dash lines and an inoperative position shown in solid lines, and in which latter position it is almost entirely within or beneath the stationary quarter sphere 38, thereby providing ready access to the interior of the heating chamber 14 for placement or removal of food thereto or therefrom.

While in all three forms herein illustrated the upper enclosure wall structure has been shown as circular in cross-section, such shape is not essential to the invention and the upper enclosure wall structure may be of any other desired cross-section.

While the invention has been shown in several forms, it will be obvious to those skilled in the art that it is not so limited, but is susceptible of various other changes and modifications without departing from the spirit thereof.

What is claimed is:

1. In electronic heating apparatus: an enclosure defining a cavity and comprising a lower enclosure wall structure adapted to be supported to depend below the top wall of a counter top or the like and an upper enclosure wall structure adapted to overlie and mate with said lower enclosure wall structure, a plate positioned within said cavity approximately in the plane of said counter top for supporting a body to be heated, said upper enclosure wall structure being provided with a pattern of perforations through which the body to be heated may be observed, and means for displacing at least a part of said upper enclosure wall structure relative to said lower enclosure wall structure, whereby free access to said supporting plate is afforded.

2. In electronic heating apparatus: an enclosure structure comprising a lower enclosure wall structure adapted to be positioned with its upper edge in a horizontal plane at a convenient elevation by a counter top or the like, and an upper enclosure wall structure adapted to overlie said lower enclosure wall structure and to define therewith a cavity, means for supplying microwave energy to said cavity through said lower enclosure wall structure, the adjacent edges of said wall structures overlapping to effect a seal against leakage of microwave energy, and a supporting plate of a material transparent to microwave energy disposed approximately in said horizontal plane and separating said cavity into upper and lower chambers, said plate providing a supporting surface for a body to be heated in said upper chamber, said upper enclosure wall structure being displaceable relative to said lower enclosure wall structure and said supporting plate for insertion and removal of a body to be heated.

3. In electronic heating apparatus: lower wall structure defining a radiating chamber adapted to be supported beneath an opening in a counter top or the like, a wave guide for directing microwave energy waves to said radiating chamber from a source of microwave energy, a dome-shaped upper wall structure adapted for disposal in overlying relation to said radiating chamber and defining a heating chamber, a plate transparent to microwave energy adapted to be disposed approximately in the plane of said counter top for separating said heating chamber and said radiating chamber and for supporting a body to be heated in said heating chamber, said upper wall structure being provided with a pattern of perforations through which the body to be heated may be observed, and mounting means for said upper wall structure so constructed and arranged that the latter may be raised sufficiently relative to the counter top to provide free access to said plate with the latter functioning as a portion of the counter top work area.

4. In electronic heating apparatus: lower wall structure defining a radiating chamber adapted to be supported beneath an opening in a counter top or the like, a wave guide for directing microwave energy to said radiating chamber from a source of microwave energy, a dome-shaped upper wall structure adapted for disposal in overlying relation to said radiating chamber and defining a heating chamber, a plate transparent to microwave energy adapted to be disposed approximately in the plane of said counter top for separating said heating chamber and said radiating chamber and for supporting a body to be heated in said heating chamber, and means supporting said upper wall structure for vertical movement between an operative position where it covers said plate with its lower edge adjacent the counter top and an inoperative position where it is spaced a sufficient distance above the counter top to permit free use of the latter, including said plate, as a work area.

5. In electronic heating apparatus: lower wall structure defining a radiating chamber adapted to be supported beneath an opening in a counter top or the like, a wave guide for directing microwave energy to said radiating chamber from a source of microwave energy, a dome-shaped upper wall structure adapted for disposal in overlying relation to said radiating chamber and defining a heating chamber, a plate transparent to microwave energy adapted to be disposed approximately in the plane of said counter top for separating said heating chamber and said radiating chamber and for supporting a body to be heated in said heating chamber, and means hingedly mounted said upper wall structure for pivotal movement between an operative position where it covers said plate with its lower edge adjacent the counter top and an inoperative position where said plate is uncovered and freely accessible.

References Cited in the file of this patent

UNITED STATES PATENTS 2,627,571    Hiehle et al.    Feb. 3, 1953

OTHER REFERENCES

Karl-August Heyne, Ole Scholz and Paul Muller, German application Serial No. B34942, printed December 13, 1956 (K 21h Gruppe 36), 4 pages spec., 1 sht. dwg.